United States Patent
Shingai et al.

(10) Patent No.: US 6,495,308 B2
(45) Date of Patent: Dec. 17, 2002

(54) OPTICAL RECORDING METHOD AND OPTICAL RECORDING MEDIUM

(75) Inventors: Hiroshi Shingai, Tokyo (JP); Hajime Utsunomiya, Tokyo (JP); Hiroyasu Inoue, Tokyo (JP); Tetsuro Mizushima, Tokyo (JP)

(73) Assignee: TDK Corporation, Tokyo (JP)

( * ) Notice: Subject to any disclaimer, the term of this patent is extended or adjusted under 35 U.S.C. 154(b) by 83 days.

(21) Appl. No.: 09/820,663

(22) Filed: Mar. 30, 2001

(65) Prior Publication Data

US 2001/0044002 A1 Nov. 22, 2001

(30) Foreign Application Priority Data

Mar. 30, 2000 (JP) .......................... 2000-095325
Feb. 28, 2001 (JP) .......................... 2001-055382

(51) Int. Cl.7 .............. G11B 7/24; G11B 7/26
(52) U.S. Cl. .............. 430/270.13; 430/270.11; 430/945; 428/64.4; 369/284
(58) Field of Search ................ 430/270.11, 270.13, 430/945; 369/284; 428/64.4

(56) References Cited

FOREIGN PATENT DOCUMENTS

| JP | 4-123333 A | * | 4/1992 |
| JP | 10-320859 | | 12/1998 |
| JP | 11-120613 | | 4/1999 |

* cited by examiner

Primary Examiner—John A. McPherson
(74) Attorney, Agent, or Firm—Oblon, Spivak, McClelland, Maier & Neustadt, P.C.

(57) ABSTRACT

An optical recording medium having at least a light-transmitting substrate, a recording layer recorded by heat mode recording, and a reflective layer comprising a metal or a semimetal disposed in this order exhibiting reduced signal noise in the reading and improved recording characteristics are provided. A method for producing such optical recording medium is also provided, and this method includes the step of changing bonding state of the element(s) constituting the reflective layer at least in the area to be recorded.

13 Claims, 2 Drawing Sheets

OPTICAL RECORDING METHOD AND OPTICAL RECORDING MEDIUM

BACKGROUND OF THE INVENTION

1. Field of the Invention

This invention relates to an optical recording medium having a recording layer to be recorded by heat mode recording such as a phase change recording layer or a magnetooptical recording layer, and a method for producing such medium.

Optical information media such as read-only optical disks and optical recording disks have been required to have a higher capacity by increasing the recording density for the purpose of recording and storing an enormous amount of information as in the case of motion picture information. Extensive efforts have been dedicated to the research and development of the recording at a higher density to meet such request.

2. Prior Art

Under such situation, one proposal has been use of a smaller laser beam spot with a reduced diameter in the recording and reading as in the case of DVD (Digital Versatile Disk) by reducing the wavelength used in the recording/reading and increasing the numerical aperture (NA) of the objective lens of the recording/reading optical system. When the DVD is compared to CD, the DVD has realized a recording capacity (of 4.7 GB/side) which is 6 to 8 times larger than that of the CD by reducing the recording/reading wavelength from 780 nm to 650 nm and by increasing the NA from 0.45 to 0.6.

Use of a higher NA, however, invites decrease of tilt margin. Tilt margin is tolerance for the tilting of the optical information medium in relation to the optical system, and the tilt margin is determined by the NA. When the recording/reading wavelength is $\lambda$, and the transparent substrate through which the medium is irradiated with the recording/reading beam has a thickness t, the tilt margin is proportional to $$\lambda/(t \cdot NA^3)$$

Tilting of the optical recording medium at an angle to the laser beam, namely, occurrence of the tilt results in the generation of wave front aberration (coma aberration). When the substrate has a refractive index of n and a tilt angle of $\theta$, the wave front aberration coefficient is given by $$(\tfrac{1}{2}) \cdot t \cdot \{n^2 \cdot \sin\theta \cdot \cos\theta\} \cdot NA^3/(n^2 - \sin^2\theta)^{-5/2}$$

These relations indicate that decrease in the thickness t of the substrate is effective when the tilt margin is to be increased with simultaneous suppression the generation of the coma aberration. As a matter of fact, tilt margin is ensured in the case of DVD by reducing the thickness of the substrate to about half (about 0.6 mm) of the thickness of the CD (about 1.2 mm). In the meanwhile, margin of the thickness unevenness of the substrate is given by $$\lambda/NA^4$$

When the substrate has an uneven thickness, such uneven thickness further results in wave front aberration (spherical aberration). When the substrate has a thickness unevenness of $\Delta t$, the spherical aberration coefficient is given by $$\{(n^2-1)/8n^3\} \cdot NA^4 \cdot \Delta t$$

As indicated by these relations, the thickness unevenness of the substrate should be reduced in order to reduce the spherical aberration associated with the increase in the NA. For example, in the case of DVD, $\Delta t$ is suppressed to $\pm 30\,\mu m$ compared to that of $\pm 100\,\mu m$ in the CD.

A structure enabling further decrease in the substrate thickness has been proposed in order to realize high quality motion picture recording for a longer period. In this structure, a substrate having normal thickness is used as a supporting substrate for ensuring rigidity of the medium, and the pits and the recording layer are formed on its surface, and a light-transmitting layer in the form of a thin substrate having a thickness of about 0.1 mm is formed on the recording layer. The medium is irradiated with the recording/reading beam through this light-transmitting layer. This structure enables drastic reduction in the thickness of the substrate, and high density recording by the use of a higher NA is thereby enabled. A medium having such structure is described, for example, in Japanese Patent Application Laid-Open Nos. (JP-A) 320859/1998 and 120613/1999.

The medium described in JP-A 320859/1998 is a magnetooptical recording medium, and this magnetooptical recording medium has a structure wherein a metal reflective layer, a first dielectric layer, a magnetooptical recording layer, a second dielectric layer, and a light-transmitting layer are disposed on the substrate in this order. In JP-A 320859/1998, surface roughness of the metal reflective layer at the interface between the dielectric layer and the metal reflective layer is reduced to the level of less than 8.0 nm based on the view that increase in the signal noise in the reading is induced by the excessively large surface roughness of the metal reflective layer formed by sputtering. In JP-A 320859/1998, an aluminum-containing material, and preferably, a material containing aluminum in admixture with at least one member selected from Fe, Cr, Ti and Si, or Au or Ag is used for constituting the metal reflective layer, and ion beam sputtering or magnetron sputtering is employed for the layer formation.

The medium described in JP-A 120613/1999 is a phase change optical recording medium wherein the medium is formed by disposing a reflective layer, a phase change recording layer, and a light-transmitting layer on the substrate in this order. This medium also reduces the surface irregularity of the reflective layer by adopting the reflective layer of particular composition. There is stated in JP-A 120613/1999 that "morphology of the boundary reflecting the grain size determined by the crystallinity of the reflective layer and the composition of the reflective layer", and therefore, it is understood that the surface roughness of the metal reflective layer is reduced in JP-A 120613/1999 by reducing the grain size.

In a phase change optical recording medium or a magnetooptical recording medium, the dielectric layer and the as deposited recording layer are amorphous, and their surface are very smooth by nature. In contrast, in the medium described in the JP-A 320859/1998 and JP-A 120613/1999, the dielectric layer and the recording layer are formed on the reflective layer, and the surface roughness of the reflective layer will be transferred to the dielectric layer and the recording layer. Accordingly, when the reflective layer has a surface roughness of considerable level, the overlying layers will also have the surface roughness of corresponding level and the boundary between the layers will be irregular. The laser beam will then be reflected at various layers, and the laser beam reflected from the medium which has undergone interference will include scattered light generated as a result of surface roughness at the boundary between the layers. It is believed that the noise in the reading is thereby increased. In view of such situation, reduction of the surface roughness of the reflective layer as described in JP-A 320859/1998 and JP-A 120613/1999 are quite effective.

However, in the investigation of the inventors of the present invention, it has been found out that the phase change optical recording medium and the magnetooptical recording medium provided with the reflective layer having an excessively small grain size suffer from insufficient recording characteristics due to insufficient heat conductivity of the reflective layer. There is a demand for further reduction in the surface roughness of the reflective layer in consideration of the ongoing shortening of the wavelength of the recording/reading laser, and in such case, heat conductivity of the reflective layer will be further reduced.

SUMMARY OF THE INVENTION

In view of the situation as described above, an object of the present invention is to provide an optical recording medium which has a light-transmitting substrate, a recording layer recorded by heat mode recording, and a reflective layer comprising a metal or a semimetal disposed in this order, and which exhibits reduced signal noise in the reading as well as improved recording characteristics.

Such objects are attained by the present invention as described in (1) to (13), below.

(1) A method for producing an optical recording medium having at least a light-transmitting substrate, a recording layer recorded by heat mode recording, and a reflective layer comprising a metal or a semimetal disposed in this order, wherein the method includes the step of changing bonding state of the element(s) constituting the reflective layer at least in the area to be recorded.

(2) The method for producing an optical recording medium according to the above (1) wherein the optical recording medium has a supporting substrate, and the medium is the one produced by forming the reflective layer, the recording layer, and the light-transmitting substrate on the supporting substrate in this order.

(3) The method for producing an optical recording medium according to the above (1) wherein, in said step of changing the bonding state of the element(s) constituting the reflective layer, the reflective layer is changed from amorphous phase to crystalline phase at least in the area to be recorded.

(4) The method for producing an optical recording medium according to the above (1) wherein, in said step of changing the bonding state of the element(s) constituting the reflective layer, grain size of the reflective layer is increased at least in the area to be recorded.

(5) The method for producing an optical recording medium according to the above (1) wherein, in said step of changing the bonding state of the element(s) constituting the reflective layer, heat conductivity of the reflective layer is increased at least in the area to be recorded.

(6) The method for producing an optical recording medium according to the above (1) wherein the reflective layer contains at least two elements.

(7) The method for producing an optical recording medium according to the above (1) wherein said recording layer is a phase change recording layer, and the step of heat treatment carried out for the purpose of changing the amorphous recording layer into crystalline state is used as said step of changing the bonding state of the element(s) constituting the reflective layer.

(8) An optical recording medium produced by the method of the above (1).

(9) An optical recording medium having at least a light-transmitting substrate, a recording layer recorded by heat mode recording, and a reflective layer comprising a metal or a semimetal disposed in this order, wherein bonding state of the element(s) constituting the reflective layer is different at least between the area to be recorded and other area, and the medium is used such that the reading beam enters the medium through the light-transmitting substrate.

(10) The optical recording medium according to the above (9) wherein the reflective layer is crystalline at least in the area to be recorded, and amorphous in other area.

(11) The optical recording medium according to the above (9) wherein grain size of the reflective layer is greater at least in the area to be recorded compared to the grain size of the reflective layer in other area.

(12) The optical recording medium according to the above (9) wherein heat conductivity of the reflective layer is greater at least in the area to be recorded compared to the heat conductivity of the reflective layer in other area.

(13) The optical recording medium according to the above (9) wherein the reflective layer comprises at least two elements.

DETAILED DESCRIPTION OF THE INVENTION

Figure 1:
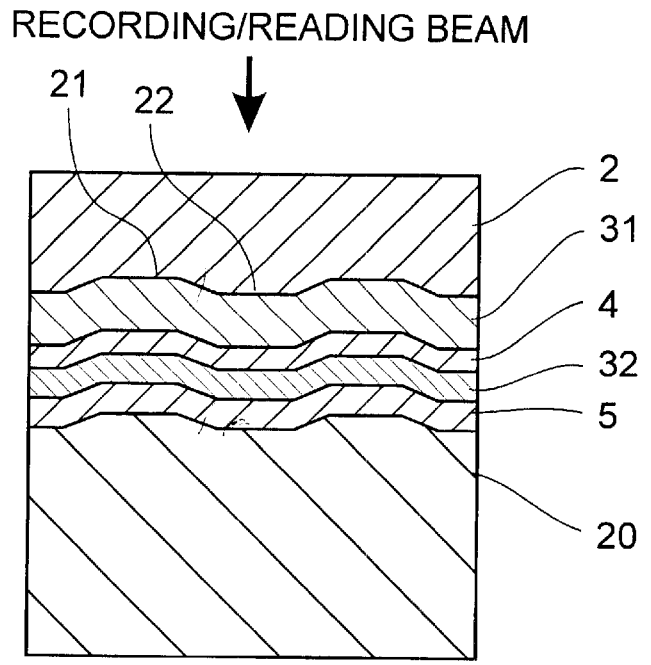
FIG. 1 is a partial cross sectional view of the optical recording medium according to an embodiment of the present invention.

In one preferred embodiment of the present invention, the optical recording medium is produced as shown in FIG. 1 by disposing on a supporting substrate 20, a reflective layer 5 comprising a metal or a semimetal, a phase change recording layer 4, and a light-transmitting substrate 2 in this order. The as deposited recording layer 4 is amorphous, and the reflective layer 5 is also formed as an amorphous layer.

Next, the recording layer 4 is heat treated for initialization (crystallization) to thereby enable recording of the medium. In the present invention, the reflective layer 5 is simultaneously crystallized with the heat treatment conducted for the purpose of initialization.

In the present invention, the reflective layer 5 is formed as an amorphous layer, and accordingly, the reflective layer 5 has an upper surface with markedly reduced surface roughness. However, in the case of a reflective layer comprising an amorphous metal, its heat conductivity will be inferior to that of the reflective layer of the same composition having the crystalline metal, and the medium with an amorphous reflective layer will not exhibit sufficient recording characteristics.

As a countermeasure for such situation, the reflective layer 5 is crystallized in the present invention by the heat treatment conducted after forming the recording layer 4 and the light-transmitting substrate 2 on the amorphous reflective layer 5. When the metal layer is formed by vapor deposition such as sputtering as an amorphous layer, and thereafter crystallized, the surface roughness in the amorphous state is substantially maintained even after the crystallization. Therefore, the surface roughness only slightly increases by the crystallization of the reflective layer 5 of the present invention while increase in the heat conductivity by the crystallization is ensured.

Consequently, decrease of the noise in the reading induced by the surface roughness of the reflective layer has been realized in the present invention while sufficient heat conductivity of the reflective layer is ensured.

In the present invention, the reflective layer preferably contains at least two elements to facilitate the formation of the reflective layer as an amorphous layer. When an alloy of the composition containing at least two elements capable of including an eutectic mixture is employed, formation of the reflective layer as an amorphous layer by vapor deposition such as sputtering is greatly facilitated.

Figure 2:
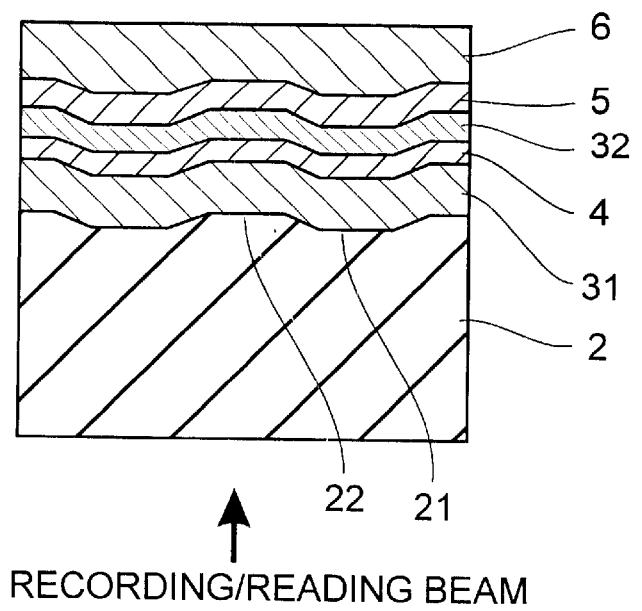
FIG. 2 is a partial cross sectional view of the optical recording medium according to another embodiment of the present invention.

The present invention is also applicable to the optical recording medium having a structure as shown in FIG. 2 which has been produced by forming the recording layer 4 and the reflective layer 5 on the light-transmitting substrate 2 in this order. In this optical recording medium, the reflective layer 5 is formed after the recording layer 4, and the lower surface of the reflective layer 5 has a reduced surface roughness compared to the upper surface of the reflective layer 5 of FIG. 1. Therefore, effect of reducing the noise in the reading of the present invention in the case of the FIG. 2 is less significant compared to the medium shown in FIG. 1. However, the effect of improving the heat conductivity is also realized in the medium of FIG. 2.

In the present invention, the change in the bonding state of the elements constituting the reflective layer by the heat treatment is not limited to the change from amorphous phase to crystalline phase, and the change may be from crystalline phase to other crystalline phase. In other words, the present invention is applicable to the case wherein the as deposited reflective layer is crystalline, and the merits of the present invention is realized as long as the heat treatment as described above results in the change of the bonding state of the elements constituting the crystalline reflective layer and improvement of the heat conductivity of the reflective layer. Even if the heat treatment results in the increase of the grain size of reflective layer, increase in the surface roughness of the reflective layer is reduced by the action as described above.

In the present invention, the heat treatment may be accomplished by a process wherein the entire medium is heated in an oven or the like. However, the heat treatment of the entire medium at a temperature allowing the crystallization of the reflective layer is likely to invite deformation of the substrate since the supporting substrate and the light-transmitting substrate are generally produced from a resin like polycarbonate which is not heat resistant. Accordingly, it is preferable in the present invention that the step of the initialization (crystallization) of the recording layer is utilized also for the heat treatment of the reflective layer.

The initialization of the phase change optical recording medium is a treatment conducted for crystallization of the recording layer which is amorphous in the as deposited state. The method employed as appropriate in industrial scale production is use of apparatus called "bulk eraser". A bulk eraser is apparatus capable of crystallizing many tracks at once by irradiating the medium with weekly focused high power gas laser or semiconductor laser beam. Use of a bulk eraser enables limited heating of the recording layer with reduced temperature elevation of the substrate, and use of a resin substrate with low heat resistance is thereby enabled.

When the disk medium is initialized on a bulk eraser in the present invention, it is preferable that only the area to be recorded, or the area to be recorded and the area nearby are irradiated by the bulk eraser and the innermost and outermost area in radial direction of the disk medium are excluded from the area of irradiation. In other words, the heat treatment is preferably conducted such that difference in the bonding state of the elements constituting the reflective layer is created between the area to be recorded and the area other than that. It is because, when the heat treatment induces change in the bonding state of the elements constituting the reflective layer, and in particular, the change from amorphous to crystalline phase, stress is caused in the interior of the reflective layer and adhesion of the reflective layer to the disk medium becomes reduced. In contrast, if the innermost and/or the outermost area of the disk medium is excluded from the heat treating area, sufficient adhesion of the reflective layer to the disk medium is retained in the innermost and/or the outermost area, and peeling of the reflective layer and other failures caused by reduced adhesion will be suppressed. It should be noted that, although the innermost and/or the outermost area of the recording layer is not crystallized in such a case, the situation is not a problem since such area are not included in the area to be recorded.

When a bulk eraser is employed for the heat treatment of the reflective layer, the power of the bulk eraser may be adequately selected depending on the material constituting the reflective layer so that the crystallization of the reflective layer is enabled.

The present invention has been described in the foregoing for the medium having a phase change recording layer recorded by heat mode recording. The present invention, however, is also applicable to mediums having a recording layer of other type as long as the recording is conducted by heat mode recording. A typical such medium is magnetooptical recording medium. The recording layer of a magnetooptical recording medium is typically formed from a rare earth element—transition element alloy, and the layer is generally amorphous. When the present invention is applied to such magnetooptical recording medium, the recording layer is not adversely affected by the heat treatment conducted for the purpose of crystallizing the amorphous reflective layer, and the heat treatment of the magnetooptical recording medium may also be accomplished on a bulk eraser. The magnetooptical recording medium can also be provided with a sufficient adhesion by excluding the innermost and/or the outermost area from the area of the heat treatment.

In the foregoing, an embodiment wherein heat treatment is used as the means for changing the bonding state of the elements constituting the reflective layer has been described. Means other than such heat treatment may be also used for changing the bonding state of the elements constituting the reflective layer.

Next, various parts of the medium of the present invention is described in detail by referring to an embodiment of phase change optical recording medium which is an optical recording medium most adapted for application of the present invention.

Structure shown in FIG. 1

FIG. 1 shows an embodiment of the optical recording medium of the present invention. This medium comprises a supporting substrate 20, and a reflective layer 5 comprising a metal or a semimetal, a second dielectric layer 32, a phase change recording layer 4, a first dielectric layer 31, and a light-transmitting substrate 2 deposited on the supporting substrate 20 in this order. The recording beam and the reading beam enter the medium through the light-transmitting substrate 2. It should be noted an intermediate layer comprising a dielectric material may be optionally provided between the supporting substrate 20, and the reflective layer 5.

Supporting substrate 20

The supporting substrate 20 is provided for the purpose of maintaining the rigidity of the medium. The thickness of the supporting substrate 20 is generally in the range of 0.2 to 1.2 mm, and preferably, in the range of 0.4 to 1.2 mm, and the supporting substrate 20 may be either transparent or non-transparent. Although the supporting substrate 20 may comprise a resin as in the case of typical optical recording medium, the supporting substrate 20 may also be formed from glass. Guide grooves 21 generally provided on the optical recording medium may be provided in the present invention by transcription of the shape of grooves formed on the supporting substrate 20 to the layers formed thereon. Land 22 is defined between two adjacent grooves 21, and the surface of the groove 21 is located on the side of the incidence of the recording/reading beam compared to the surface of the land 22.

Reflective layer 5

As described above, the reflective layer 5 of the present invention is crystalline at least in the area to be recorded.

The average grain size in the crystalline area of the reflective layer 5 is not particularly limited, and the average grain size may be adequately determined depending on the composition of the reflective layer so that the required heat conductivity is realized. The average grain size, however, is generally at least 20 nm, and preferably at least 30 nm. When the average grain size is excessively small, heat conductivity will be low and heat will not be dissipated from the recording layer when the layer is irradiated with the recording beam, and the recording characteristics will be impaired. For example, amorphous record marks may become partly erased by the undissipated heat and the medium will suffer from low CNR (carrier to noise ratio). On the other hand, an excessively large average grain size will results in poor surface properties of reflective layer, and the average grain size is preferably up to 100 nm, and more preferably up to 70 nm.

The average grain size is measured in the present invention by X-ray diffraction. More illustratively, the reflective layer is evaluated with a powder X-ray diffractometer or a thin film X-ray diffractometer, and the crystallite size $D_{hkl}$ is calculated by substituting the measurement data in Scherrer equation:

$$D_{hkl} = \frac{K\lambda}{\beta\cos\theta} \quad (1)$$

In the equation (1), K is a constant, and in the medium of the present invention, $D_{hkl}$ is calculated by assuming K to be 0.9. $\lambda$ is the wavelength (unit: nm) of the X-ray; $\beta$ is half width (unit: rad) of the diffraction peak; and $\theta$ is Bragg angle of the diffraction line. Use of a diffraction line with strongest intensity is preferable for the calculation of the crystallite size. For example, in the metal reflective layer having face centered cubic structure, the crystallite size is typically determined by using the diffraction line of (111) plane.

It should be noted that, in the case of an amorphous reflective layer, no clear peak is found in the X-ray diffraction profile.

In the present invention, the reflective layer may be formed from any desired material, and typically, from a metal or a semimetal such as Al, Au, Ag, Pt, Cu, Ni, Cr, Ti, or Si as a simple substance or as an alloy containing at least one of such elements. In the preferred embodiment of the present invention, the reflective layer is formed as an amorphous layer, and the thus formed amorphous layer is crystallized by heat treatment. When the reflective layer is to be formed as an amorphous layer, it is preferable that the reflective layer contains at least two elements, and that the reflective layer can contain a eutectic mixture. In the present invention, "reflective layer can contain a eutectic mixture" means that a eutectic mixture can be present when the reflective layer is crystallized from the molten state. Exemplary preferable alloys which can include a eutectic mixture include alloys prepared by adding at least one element selected from Au, Ce, Ge, In, La, Ni, Pd, Pt, Si, Te, and Cu to Al; alloys prepared by adding at least one element selected from Ce, Cu, Ge, La, S, Sb, Si, Te, and Zr to Ag; alloys prepared by adding at least one element selected from Co, Ge, In, La, Mn, Sb, Si, and Te to Au; and alloys prepared by adding at least one element selected from Fe, Ge, Sb, Si, Te, and Ti to Cu. More illustratively, the composition of the eutectic mixture in the case of Al—Pd alloy is $Al_{92.5}Pd_{7.5}$ in atomic ratio. In the present invention, the reflective layer may comprise a composition which is identical with the eutectic mixture. However, a reflective layer in amorphous state can be obtained even if the reflective layer comprises a composition different from the eutectic mixture as long as the composition can contain the eutectic mixture as in the case of $Al_{72.4}Pd_{27.6}$ alloy which is used in the Example as described below. Accordingly, composition which is capable forming amorphous reflective layer can be determined by experiments.

Formation of the reflective layer as an amorphous layer, and control of the grain size of the reflective layer may also be accomplished by controlling the conditions in the formation of the reflective layer. When the reflective layer is formed by sputtering, the grain size can be decreased by increasing the sputtering power or by decreasing the sputtering pressure.

The reflective layer is typically deposited to a thickness of 10 to 300 nm. The reflectivity is less likely to be sufficient when the thickness is below such range, and deposition to a thickness beyond such range is economically disadvantageous since no substantial improvement in the reflectivity is attained by additional increase in the thickness. It should be noted that the signal noise in the reading critically increases when the thickness of the reflective layer reaches 50 nm, and in particular, 60 nm, and the present invention is particularly effective for the medium having the reflective layer of such thickness. The reflective layer is preferably formed by vapor deposition such as sputtering and evaporation, and most preferably, by sputtering.

First dielectric layer 31 and second dielectric layer 32

These dielectric layers prevent oxidation and degradation of the recording layer 4, and also, protect the supporting substrate 20 and the light-transmitting substrate 2 from the heat transmitted from the recording layer 4 during the recording by blocking the heat or by dissipating such heat in lateral direction of the layer. Provision of the dielectric layers also contributes for improving the degree of modulation. Each dielectric layer may also comprise a laminate of two or more dielectric layers each having different compositions.

The dielectric material used for these dielectric layers is preferably a compound containing at least one metal component selected from Si, Ge, Zn, Al, and rare earth metals, and the material is preferably an oxide, a nitride, or a sulfide. A mixture containing two or more of the foregoing may also be used. Exemplary preferable materials are a mixture of zinc sulfide and silicon oxide ($ZnS$-$SiO_2$), aluminum nitride, and aluminum oxide. The thickness of the dielectric layers may be adequately determined so that sufficient improvement in the protection and degree of modulation are achieved. However, the first dielectric layer 31 is preferably deposited to a thickness of 30 to 300 nm, and more preferably, to a thickness of 50 to 250 nm, and the second dielectric layer 32 is preferably deposited to a thickness of 10 to 50 nm, and more preferably, to a thickness of 13 to 45 nm. The dielectric layers are preferably formed by sputtering.

Recording layer 4

The recording layer 4 is not particularly limited for its composition, and the material used may be adequately selected from various phase change recording materials, and preferably, from those containing at least Sb and Te. To be more specific, the recording layer is preferably formed from a material containing Sb and Te as its main components, Ag, In, Sb and Te as its main components, or Ge, Sb and Te as its main components.

When the atomic ratio of the constituent elements in the recording layer containing Sb and Te as its main components or the recording layer containing Ag, In, Sb and Te as its main components is represented by the formula (I):

$$Ag_a In_b Sb_c Te_d \quad (I)$$

a, b, c, and d are preferably such that:
 $0 \leq a \leq 0.20$,
 $0 \leq b \leq 0.20$,
 $0.35 \leq c \leq 0.80$, and
 $0.08 \leq d \leq 0.40$; and more preferably such that:
 $0.01 \leq a \leq 0.10$,
 $0.01 \leq b \leq 0.10$,
 $0.35 \leq c \leq 0.80$, and
 $0.08 \leq d \leq 0.40$; and still more preferably such that:
 $0.01 \leq a \leq 0.10$,
 $0.01 \leq b \leq 0.10$,
 $0.50 \leq c \leq 0.75$, and
 $0.10 \leq d \leq 0.35$.

The recording layer may optionally contain elements other than the main components as described above. Such additional elements may be element M which is at least one element selected from Ge, H, Si, C, V, W, Ta, Zn, Ti, Sn, Pb, Pd, and rare earth elements (Sc, Y, and lanthanoids). Content of the element M in the recording layer is preferably up to 10 at %.

The recording layer preferably consists essentially of the elements as described above. However, it is acceptable that Ag is partially replaced by Au; Sb is partially replaced by Bi; Te is partially replaced by Se; and In is partially replaced by Al and/or P. The percent replacement is preferably up to 50 at % in all cases.

The recording layer containing Ge, Sb and Te as the main components may typically comprise a composition $Ge_2Sb_2Te_5$. When the atomic ratio of the constituent elements in such compositional system is represented by the formula (II):

$$Ge_a Sb_b Te_{1-a-b} \quad (II)$$

a and b are preferably such that:
 $0.08 \leq a \leq 0.35$, and
 $0.12 \leq b \leq 0.40$.

The recording layer is preferably deposited to a thickness of 7 to 50 nm, and more preferably, to a thickness of 8 nm to 30 nm. When the recording layer is too thin, growth of the crystalline phase will be difficult, and the reflectivity difference occurred by the phase change will be insufficient. On the other hand, when the recording layer is too thick, the recording layer will have an increased heat capacity to render the recording difficult. An excessively thick recording layer also results in the reduced reflectivity and in the reduced degree of modulation. The recording layer is preferably formed by sputtering.

Light-transmitting substrate 2

The light-transmitting substrate 2 has a light transmittance sufficient for transmitting the recording/reading beam. The light-transmitting substrate 2 may comprise a resin or glass plate having a thickness substantially equivalent to the supporting substrate 20.

The present invention, however, is particularly effective for use in the high density recording. Accordingly, use of a light-transmitting layer by reducing the thickness of the light-transmitting substrate 2 is preferable as in the case of the light-transmitting layer described in JP-A 320859/1998 as described above for the purpose of enabling the recording at a high recording density by using a recording/reading optical system having a high NA.

The light-transmitting layer may be provided, for example, by adhering a light-transmitting sheet comprising a light-transmitting resin on the first dielectric layer 31 by means of an adhesive or a pressure-sensitive adhesive, or by directly forming the light-transmitting resin layer on the first dielectric layer 31 by coating. The light-transmitting layer is not limited for its material as long as it is capable of sufficiently protecting the reflective layer, the recording layer, and the like, and the light-transmitting layer may comprise a thin film of an inorganic material. The inorganic material used for the light-transmitting layer may be selected from various inorganic compounds mentioned in the foregoing in the description of the dielectric layer as well as carbides, carbon, and mixtures thereof such as silicon carbide and diamond-like carbon. The light-transmitting layer comprising an inorganic material may be formed, for example, by vapor deposition such as sputtering.

The thickness of the light-transmitting layer comprising a resin is preferably selected from the range of 30 to 300 μm. When the light-transmitting layer is too thin, unduly serious optical effects may be brought by the dust attached to the surface of the light-transmitting layer. On the other hand, when the light-transmitting layer is too thick, recording at a higher recording density by the use of a higher NA will be difficult. The thickness of the light-transmitting layer comprising an inorganic material is preferably selected from the range of 5 to 500 nm. When the light-transmitting layer comprising an inorganic material is too thin, protective action will be insufficient while an excessively thick light-transmitting layer will invite increase of internal stress and increased occurrence of cracks. It should be noted that the light-transmitting layer may have a thickness of less than 30 μm if there is not need to take the influence of the dust into account, and sufficient protective effects are achieved when the light-transmitting layer has a thickness of 0.5 to 15 μm. When the light-transmitting layer has a thickness of less than 30 μm, the medium is preferably produced in the form of a sealed-type fixed disk as in the case of the hard disk or in the form of a disk accommodated in a cartridge.

Structure shown in FIG. 2

The optical recording medium shown in FIG. 2 comprises a light-transmitting substrate 2, and a first dielectric layer 31, a recording layer 4, a second dielectric layer 32, a reflective layer 5, and a protective layer 6 deposited on the light-transmitting substrate 2 in this order. The recording beam and the reading beam enter the medium through the light-transmitting substrate 2.

The light-transmitting substrate 2 of FIG. 2 may comprise a layer similar to the supporting substrate 20 of FIG. 1. The light-transmitting substrate 2, however, should be capable of transmitting the light.

The protective layer 6 is provided for improving scratch resistance and corrosion resistance. Preferably the protective layer is formed of an organic material, typically a radiation curable compound or a composition thereof which has been cured with radiation such as electron and UV radiation. The protective layer is generally about 0.1 to about 100 μm thick and may be formed by conventional techniques such as spin coating, gravure coating, spray coating, and dipping.

Other layers are similar to the embodiment shown in FIG. 1.

EXAMPLES

Example 1

A reflective layer comprising $Al_{72.4}Pd_{27.6}$ (mole %) alloy was formed on a slide glass by dual sputtering to a thickness of 100 nm, and the sample was heat treated at 300° C. for 30 minutes. The sample was evaluated before and after the heat treatment, for crystal structure and average grain size by X ray diffractometry, for the surface roughness of the reflective layer by atomic force microscope, and for heat conductivity by measuring electric resistance value. The results are shown in Table 1.

TABLE 1

|  | Crystal structure | Average grain size (nm) | Surface roughness Ra (nm) | Heat conductivity (W/m · K) |
|---|---|---|---|---|
| Before heat treatment | Amorphous | — | 0.4 | 8.5 |
| After heat treatment | Crystalline | 28 | 0.5 | 18.3 |

As shown in Table 1, increase in heat conductivity has been realized with no substantial increase in the surface roughness by the crystallization of the amorphous reflective layer.

Next, the sample of the optical recording disk having the structure as shown in FIG. 2 was produced by the procedure as described below.

A light-transmitting substrate 2 in the form of a disk having a diameter of 120 mm and a thickness of 0.6 mm was prepared by injection molding polycarbonate. Grooves were simultaneously formed in the injection molding of the light-transmitting substrate 2.

The first dielectric layer 31 formed had a dual-layer structure. The dielectric layer on the side of the light-transmitting substrate 2 was formed by sputtering in argon atmosphere using ZnS (80 mole %) - $SiO_2$ (20 mole %) for the target to a thickness of 130 mm. The dielectric layer on the side of the recording layer 4 was formed by sputtering in argon atmosphere using ZnS (50 mole %) - $SiO_2$ (50 mole %) for the target to a thickness of 5 nm.

The recording layer 4 was prepared by sputtering in argon atmosphere using Ag—In—Sb—Te alloy for the target. The recording layer had the composition (molar ratio):

$$Ag_a In_b Sb_c Te_d$$

wherein a is 0.06, b is 0.04, c is 0.65, and d is 0.25. The recording layer was formed to a thickness of 15 nm.

The second dielectric layer 32 was formed by sputtering in argon atmosphere using ZnS (50 mole %) - $SiO_2$ (50 mole %) for the target. The second dielectric layer was formed to a thickness of 28 nm.

The reflective layer 5 was formed by repeating the procedure of the formation of the reflective layer on the slide glass.

The recording layer of this sample was initialized (crystallized) on a bulk eraser at a wavelength of 810 nm in the annular area at a radial distance of 21 to 59 mm from the disk center. It should be noted that the area to be recorded was the area at a radial distance of 24.0 to 58.5 from the disk center.

The crystal structure of the reflective layer was evaluated before and after the initialization by X-ray diffractometry. The reflective layer was amorphous before the initialization while the area to be recorded had turned crystalline after the initialization. The average grain size of the crystalline area measured by X-ray diffractometry was 34.6 nm.

It should be noted that a sample for comparison purpose was also prepared by repeating the production procedure of the sample of the present invention except that the reflective layer 5 was produced from an alloy containing 0.61% of Si, 0.43% of Fe, 0.28% of Cu, 0.03% of Mn, 0.24% of Cr, 1.01% of Mg, 0.04% of Ti (all by mass %) and the residue of Al. When the reflective layer was evaluated by X-ray diffractometry, the reflective layer was crystalline both before and after the initialization.

Example 2

The sample of the present invention having the structure shown in FIG. 1 was produced by the procedure as described below. A polycarbonate disk having a diameter of 120 mm and a thickness of 0.6 mm was used for the supporting substrate 20.

The reflective layer 5 and the second dielectric layer 32 were formed by repeating the procedure of Example 1.

The recording layer 4 was prepared by sputtering in argon atmosphere. The recording layer had the composition (molar ratio):

$$Ag_{0.06}In_{0.04}Sb_{0.63}Te_{0.25}Ge_{0.02}$$

The recording layer was formed to a thickness of 14.5 nm.

The first dielectric layer 31 formed had a dual-layer structure. The dielectric layer on the side of the recording layer 4 was formed by sputtering in argon atmosphere using ZnS (50 mole %) - $SiO_2$ (50 mole %) for the target to a thickness of 5 nm. The dielectric layer on the side of the light-transmitting substrate 2 was formed by sputtering in argon atmosphere using ZnS (80 mole %) - $SiO_2$ (20 mole %) for the target to a thickness of 232 mm.

Finally, a polycarbonate disk of 0.6 mm thick was adhered as the light-transmitting substrate 2.

A sample for comparison purpose was also produced by repeating the procedure as described above except that the reflective layer 5 was formed as in the case of the comparative sample of Example 1.

The sample of the invention and the comparative sample were initialized as in the case of Example 1. The reflective layer of the sample of the invention was amorphous before the initialization and the initialized area was found to be crystalline after the initialization. The average grain size of the crystalline area was equivalent to that of the sample of the invention in Example 1. On the contrary, the reflective layer of the comparative sample was crystalline both before and after the initialization as in the case of the comparative sample of Example 1.

Evaluation

Standard data for evaluation of noise in the reading were prepared by the procedure as described below.

Standard samples were produced by depositing a reflective layer of $Al_{98.3}Cr_{1.7}$ (molar ratio) alloy to different thickness by sputtering on the supporting substrate in the form of a disk having a diameter of 120 mm and a thickness of 0.6 mm prepared by injection molding polycarbonate with grooves formed simultaneously in the injection molding.

The thus produced standard samples were measured by irradiating the medium with a laser beam through the supporting substrate for the amount of light reflected and the noise level in the reading at a frequency of 4.3 MHz, which is the frequency corresponding the frequency of the signal in the reading at a linear velocity of 3.5 m/s in the disk wherein record marks had been formed at the mark/space of 0.4 $\mu$m/0.4 $\mu$m. The wavelength of the laser beam was 410 nm, and numerical aperture of the objective lens in the irradiation optical system was 0.6.

Figure 3:
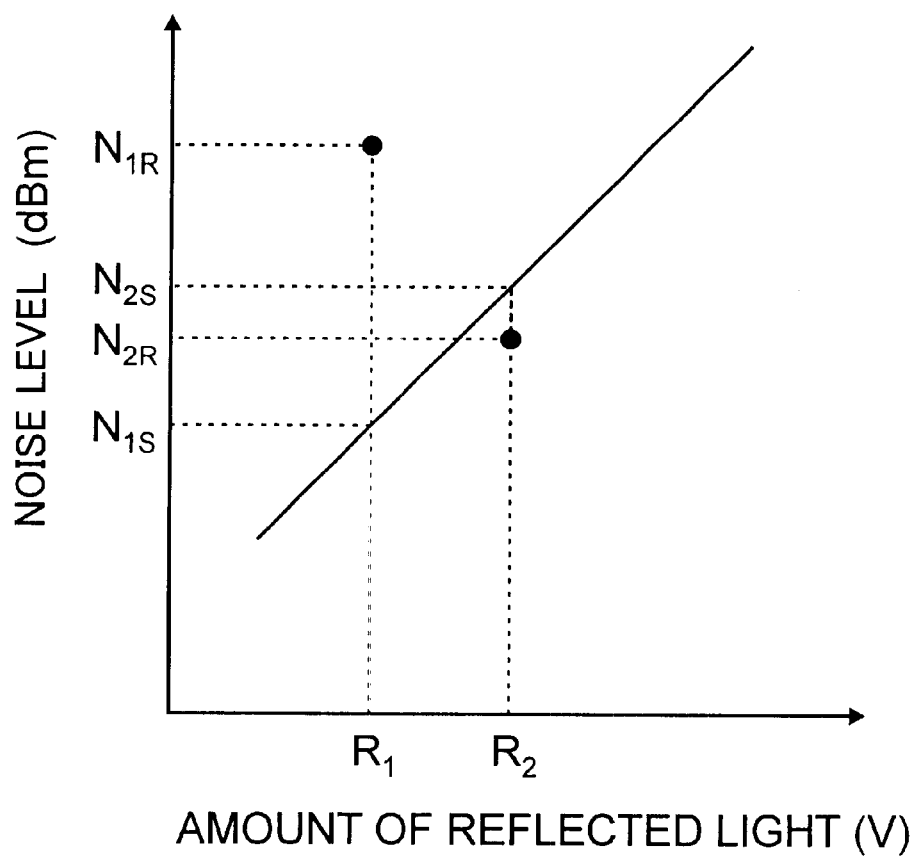
FIG. 3 is a graph showing noise level in relation to the amount of the reflected light.

Relation between the amount of the light reflected and the noise level was determined from the thus obtained measurements. The relation is represented by the reflected light amount—noise level line as schematically shown in FIG. 3. The noise level was very low in the standard sample since the laser beam is reflected at the surface of the reflective layer which is formed in contact with the smooth supporting substrate.

The sample of the invention and the comparative sample were then measured for the amount of light reflected and the noise level at a frequency of 4.3 MHz by irradiating the medium through the light-transmitting substrate 2. The results are shown in Table 2. In Table 2, $N_R$ is the value actually measured for the noise level, while $N_S$ is the noise level determined from the reflected light amount—noise level line by plotting the amount of light reflected in each sample, namely, the standard noise level at the particular amount of light reflected. In FIG. 3, $R_1$, $N_{1R}$, and $N_{1S}$ correspond to the amount of reflected light, the measured noise level, and the standard noise level of the comparative sample, and $R_2$, $N_{2R}$, and $N_{2S}$ corresponds to the amount of reflected light, the measured noise level, and the standard noise level of the sample of the invention. As demonstrated in FIG. 3, difference between the measured noise level and standard noise level ($N_R$-$N_S$ in Table 2) will serve an index in evaluating the noise level without depending on the amount of reflected light.

TABLE 2

| Sample | Amount of reflected light (V) | $N_R$ (dBm) | $N_S$ (dBm) | $N_R$-$N_S$ (dBm) |
|---|---|---|---|---|
| Invention | 0.41 | −68.9 | −68.7 | −0.2 |
| Comparative | 0.30 | −63.5 | −69.7 | 6.2 |

The merits of the present invention are evident from Table 2. The measured noise level $N_R$ is as low as below the standard noise level $N_S$ in the sample of the invention in contrast to the significantly large $N_R$-$N_S$ in the comparative sample.

MERITS OF THE INVENTION

In the preferred embodiment of the present invention, the medium is produced by forming the reflective layer as an amorphous layer and forming the recording layer and other layers on the reflective layer, and then heat treating the medium for crystallization of the reflective layer. As a consequence, the reflective layer of the optical recording medium of the present invention exhibits reduced surface roughness simultaneously with high heat conductivity. An optical recording medium exhibiting reduced signal noise in the reading as well as improved recording characteristics are thereby realized by the present invention.

Japanese Patent Application Nos. 095325/2000 and 055382/2001 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for producing an optical recording medium having at least a light-transmitting substrate, a recording layer recorded by heat mode recording, and a reflective layer comprising a metal or a semimetal disposed in this order, wherein the method includes the step of changing bonding state of the element(s) constituting the reflective layer at least in the area to be recorded.

2. The method for producing an optical recording medium according to claim 1 wherein the optical recording medium has a supporting substrate, and the medium is the one produced by forming the reflective layer, the recording layer, and the light-transmitting substrate on the supporting substrate in this order.

3. The method for producing an optical recording medium according to claim 1 wherein, in said step of changing the bonding state of the element(s) constituting the reflective layer, the reflective layer is changed from amorphous phase to crystalline phase at least in the area to be recorded.

4. The method for producing an optical recording medium according to claim 1 wherein, in said step of changing the bonding state of the element(s) constituting the reflective layer, grain size of the reflective layer is increased at least in the area to be recorded.

5. The method for producing an optical recording medium according to claim 1 wherein, in said step of changing the bonding state of the element(s) constituting the reflective layer, heat conductivity of the reflective layer is increased at least in the area to be recorded.

6. The method for producing an optical recording medium according to claim 1 wherein the reflective layer contains at least two elements.

7. The method for producing an optical recording medium according to claim 1 wherein said recording layer is a phase change recording layer, and the step of heat treatment carried out for the purpose of changing the amorphous recording layer into crystalline state is used as said step of changing the bonding state of the element(s) constituting the reflective layer.

8. An optical recording medium produced by the method of claim 1.

9. An optical recording medium having at least a light-transmitting substrate, a recording layer recorded by heat mode recording, and a reflective layer comprising a metal or a semimetal disposed in this order, wherein bonding state of the element(s) constituting the reflective layer is different at least between the area to be recorded and other area, and the medium is used such that the reading beam enters the medium through the light-transmitting substrate.

10. The optical recording medium according to claim 9 wherein the reflective layer is crystalline at least in the area to be recorded, and amorphous in other area.

11. The optical recording medium according to claim 9 wherein grain size of the reflective layer is greater at least in the area to be recorded compared to the grain size of the reflective layer in other area.

12. The optical recording medium according to claim 9 wherein heat conductivity of the reflective layer is greater at least in the area to be recorded compared to the heat conductivity of the reflective layer in other area.

13. The optical recording medium according to claim 9 wherein the reflective layer comprises at least two elements.

* * * * *